Jan. 13, 1970  R. C. BUELER  3,489,465
CONTROL VALVE

Filed Aug. 22, 1966  3 Sheets-Sheet 1

INVENTOR
RICHARD C. BUELER
BY Joseph E. Papin

Jan. 13, 1970  R. C. BUELER  3,489,465
CONTROL VALVE
Filed Aug. 22, 1966  3 Sheets-Sheet 2

INVENTOR
RICHARD C. BUELER
BY
*Joseph E. Papin*

Jan. 13, 1970 R. C. BUELER 3,489,465
CONTROL VALVE
Filed Aug. 22, 1966 3 Sheets-Sheet 3

INVENTOR
RICHARD C. BUELER
BY
Joseph E. Papin ured # United States Patent Office 3,489,465
Patented Jan. 13, 1970

3,489,465
CONTROL VALVE
Richard C. Bueler, Glendale, Mo., assignor, by mesne assignments, to Wagner Electric Corporation, South Bend, Ind., a corporation of Delaware
Filed Aug. 22, 1966, Ser. No. 574,241
Int. Cl. B60t *11/34, 8/14;* G05b *13/00*
U.S. Cl. 303—24                           13 Claims

ABSTRACT OF THE DISCLOSURE

A brake control device having a first member movable in response to supplied fluid pressure to effect an applied fluid pressure in a first predetermined ratio therewith, and a second member thereafter concertedly movable with said first member in response to the supplied fluid pressure to effect an applied fluid pressure in a second predetermined ratio therewith.

---

Figure 1:
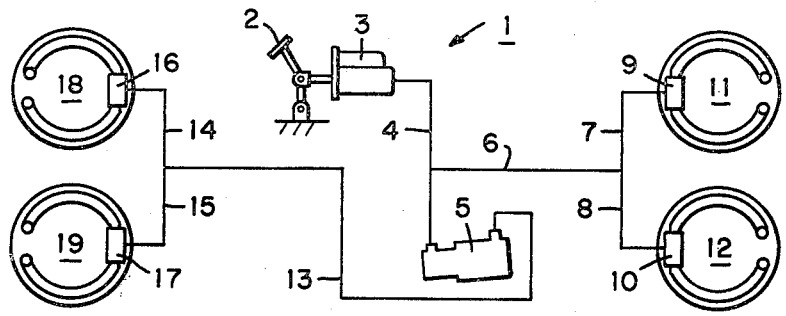

This invention relates to fluid pressure systems and more particularly to a control valve for use in such a fluid pressure system.

In the past, to compensate for the dynamic weight differential established between the front and rear brakes by the inertia weight shift toward the front of a vehicle during a braking application and to thus minimize the danger of skidding the rear wheels, a ratio changing type control valve was provided in the vehicle fluid pressure system. These ratio changing type control valves have the general characteristics of permitting initial energization of the front and rear brakes and thereafter establishing a fluid pressure differential between said front and rear brakes so that said front brakes can be energized by a greater amount than said rear brakes. However, these prior art control valves have provided for only one transition or fluid pressure differential between the front and rear brakes, and it has been found that this one step fluid pressure relationship does not provide the most desirable relationship between the front and rear brakes.

It is therefore a general object of the present invention to provide a novel control valve which provides for more than one fluid pressure step or transition to obtain a fluid pressure differential which more closely approximates the desired pressure relationship between the front and rear brakes.

Another object of the present invention is to provide a novel control valve for effecting a fluid pressure differential between vehicle front and rear brakes to compensate for the inertia weight shift of the vehicle during deceleration and to more closely proportion the amount of braking force between front and rear brakes to the dynamic weight on the front and rear brakes during braking application.

Still another object of the present invention is to provide a control valve containing a first ratio changing piston having opposed differential ends in constant pressure fluid communication with the inlet and outlet ports of said valve, said first piston being effective after a predetermined occurrence in the braking application to establish a fluid pressure differential between the inlet and outlet ports, and a second ratio changing piston movable upon the establishment of a predetermined fluid pressure differential by said first ratio changing piston to establish a second fluid pressure differential between the inlet and outlet fluid pressures.

Still another object of the present invention is to provide a novel control valve which establishes a smooth transition into these multi-stage fluid pressure ratio changes.

Still another object of the present invention is to provide a control valve of simplified construction for ease and economy of manufacture.

These and other objects and advantages will become apparent hereinafter.

Briefly, the present invention comprises a control valve for a vehicle having a housing, control means movable in said housing in response to applied fluid pressure thereto to establish displaced fluid pressure in a predetermined ratio to the applied fluid pressure, and other control means thereafter movable upon the establishment of a predetermined fluid pressure differential between the applied and displaced fluid pressures to establish a second ratio between the applied and displaced fluid pressures.

Figure 2:
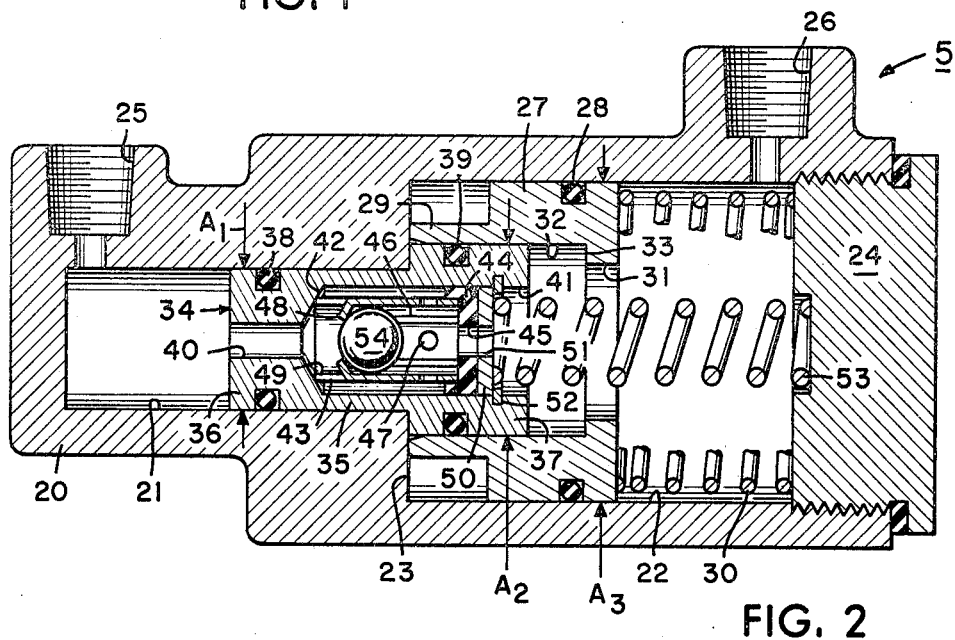
Figure 3:
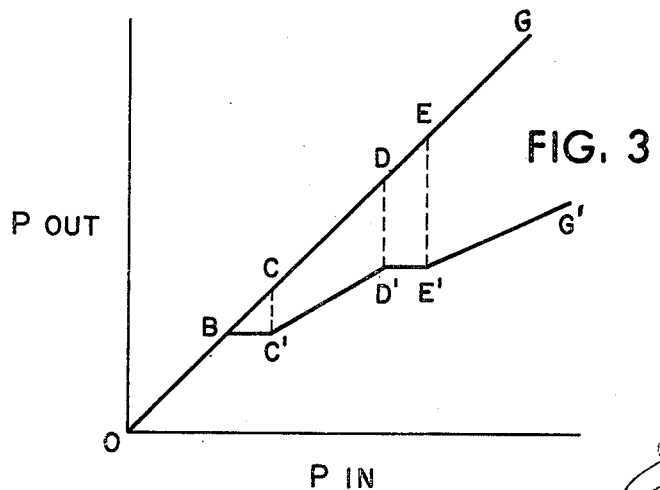
Figure 4:
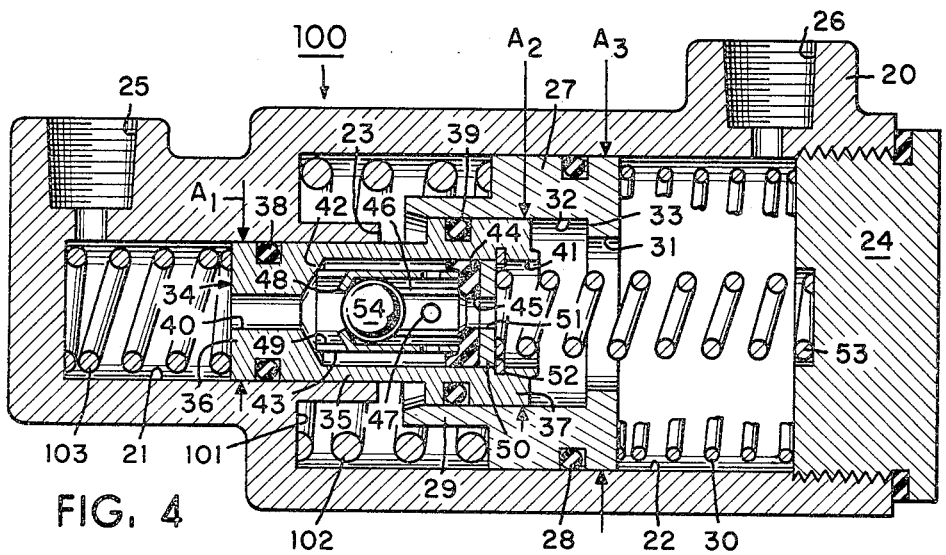
Figure 6:
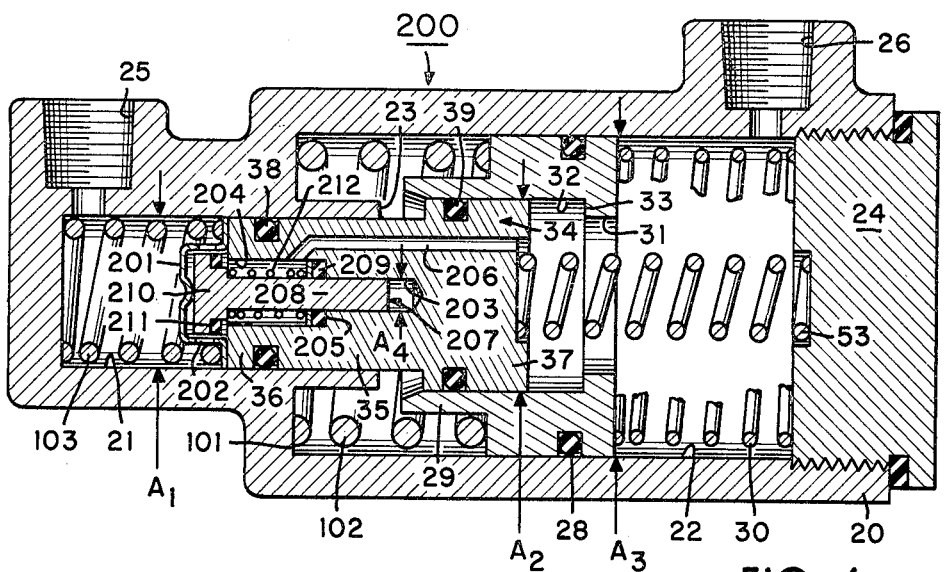
Figure 5:
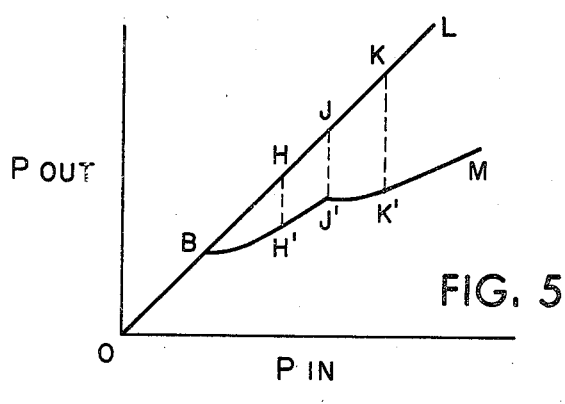
Figure 7:
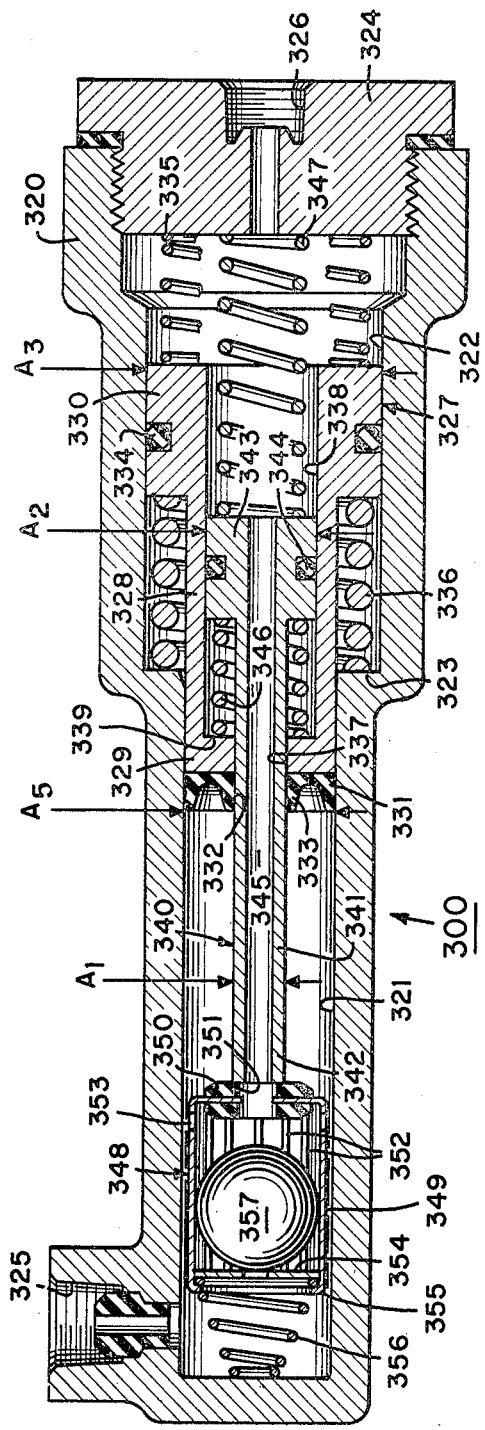

In the drawings which illustrate embodiments of the present invention,

FIG. 1 is a diagrammatic view of a fluid pressure system having a control valve therein embodying the present invention, FIG. 2 is a sectional view showing the control valve of FIG. 1 in cross-section, FIG. 3 is a graphical representation of the brake pressure of the fluid pressure system of FIG. 1 as effected by the control valve therein, FIG. 4 is a sectional view showing another embodiment of the present invention in cross-section, FIG. 5 is a graphical representation of the brake pressure of the fluid pressure system as effected by the embodiment of the control valve as shown in FIG. 4, FIG. 6 is a sectional view showing another embodiment of the present invention in cross-section, and FIG. 7 is a sectional view showing another embodiment of the present invention in cross-section.

Referring to the drawings in detail and in particular to FIG. 1, a fluid pressure system 1 is provided with a brake pedal 2 operably connected with a fluid pressure generating means or master cylinder 3, and a delivery conduit 4 connects the master cylinder 3 with the inlet port of a ratio changing or control valve 5. A delivery conduit 6 has one end connected with the conduit 4 and the other end thereof branches at conduits 7 and 8 for connection with servo motors or wheel cylinders 9, 10 of the front brake assemblies 11, 12. Another conduit 13 has one end connected with the outlet port of the control valve 5, and the other end thereof branches at 14, 15 for connection with servo motors or wheel cylinders 16, 17 of the rear brake assemblies 18, 19. It should be noted that the control valve 5 is mounted at a predetermined angle inclined to the horizontal with the inlet port at a lower elevation than the outlet port when the vehicle is on a level roadway.

Referring now to FIG. 2, the control valve 5 is provided with a housing 20 having an axially aligned bore and counterbore 21, 22 therein, and an abutment or radial shoulder 23 is defined at the intersection thereof. The leftward end of the bore 21 is closed by the housing 20, and the rightward end of the counterbore 22 is closed by a plug member 24 threadedly received therein. An inlet port 25 which receives the conduit 4, as previously mentioned, is provided in the housing 20 connecting with the bore 21 adjacent the leftward end thereof, and an outlet port 26 which receives the conduit 13, as previously mentioned, is also provided in the housing 20 connecting with the counterbore 22 adjacent the rightward end thereof.

A control or ratio changing piston 27 is slidably received in the counterbore 22, and a seal 28 adjacent to the rightward end thereof provides sealing engagement with said counterbore. An axial extension 29 is provided on the leftward end of the piston 27 and is engageable with the shoulder 23. A return spring 30 is biased between the rightward end of the piston 27 and the plug member 24 normally urging said piston leftwardly to its original position with the extension 29 abuttingly engaging the shoulder 23. A bore and counterbore 31, 32 are provided through the piston 27 substantially coaxially with the bore 21 in the housing 20 and define an abument or radial shoulder 33 at the juncture thereof.

Another ratio changing or control piston, indicated generally at 34, is provided with a stepped body portion 35 having opposed ends 36, 37 which are slidably received in the housing bore 21 and the counterbore 32 in the control piston 27, respectively. A seal 38 is provided on the leftward or smaller piston end 36 for sealing engagement with the housing bore 21, and another seal 39 is provided on the rightward or larger piston end 37 for sealing engagement with the counterbore 32 in the control piston 27. An axial bore and counterbore 40, 41 extend through the opposed ends of the piston 34 and define an annular shoulder 42 at the juncture thereof.

A hollow cylindrical ball cage member 43 is provided in the counterbore 41 having a valve seal or seat 44 on the rightward end thereof, and said seal is provided with a centrally located aperture 45 therethrough. Longitudinal ribs or flutes 46 are provided on the inside of the ball cage member 43 and a plurality of radially extending passages 47 extend through the rightward end of said ball cage member adjacent to the valve seat 44 connecting the counterbore 41 with the interior of said ball cage member. The leftward end 48 of the ball cage member 43 extends radially inwardly and a plurality of extensions 49 are provided on said leftward end for abutting engagement with the shoulder 42. A retaining plate 50 is provided adjacent to the rightward end of the seal 44 and said retaining plate has an aperture 51 therethrough in substantial alignment with the aperture 45 in said seal. A stop ring and groove assembly 52 is provided in the counterbore 41 adjacent the plate 50 retaining the ball cage member 43 against displacement from said counterbore and maintaining the extensions 49 in abutting engagement with the shoulder 42. A return spring 53 is biased between the plug member 24 and the retaining plate 50 normally urging the ball cage member 43 leftwardly which serves to move the piston 34 to its original position with the larger end 37 abuttingly engaging the shoulder 23.

An inertia or deceleration responsive ball valve 54 is provided in the ball cage member 43 for sealing engagement with the valve seat 44. The ball valve 54 is retained against displacement from the ball cage member 43 by the leftward end 48 thereof and the flutes 46 permit said ball to freely roll between said leftward end and said valve seat and also permit the flow of fluid past said ball. With the control valve 5 mounted at an inclined angle to the horizontal, as previously mentioned, so that the inlet port 25 is lower than the outlet port 26, the ball valve 54 is normally in its leftward position at rest against the leftward end 48 of the ball cage member 43 and disengaged from the valve seat 44.

To complete the description of the control valve 5, it should be noted that the leftward end 36 of the piston 34 slidable in the housing bore 21 is provided with an effective fluid pressure responsive area $A_1$ which is proportionally smaller by a predetermined ratio than an opposing effective fluid pressure responsive area $A_2$ provided on the rightward end 37 of said piston slidable in the counterbore 32 of the piston 27. Also, it should be noted that an effective fluid pressure responsive area $A_3$ is provided on the piston 27 which is defined by the piston 27 across the seal 28 minus the area of the counterbore 32 or $A_2$.

In the operation with the component parts of the control valve 5 in their normal positions, as shown in FIG. 2 and as described hereinabove, a manually applied force on the brake pedal 2 displaces pressure fluid from the master cylinder 3 through the conduits 4, 6, 7 and 8 into the wheel cylinders 9, 10 to initially energize the front wheel brake assemblies 11, 12. The displaced pressure fluid also flows from the conduit 4 through the inlet port 25 of the control valve 5 into the housing bore 21 and therefrom through the bore and counterbore 40, 41 of the piston 37 past the extensions 49, through the passages 47 and the inside of the ball cage member 43, the aperture 45 in the seal 44, the aperture 51 in the retaining plate 50, and the counterbore and bore 32, 31 of the piston 27 into the housing counterbore 22. The displaced pressure fluid flows from the counterbore 22 through the outlet port 26 and conduits 13, 14 and 15 into the wheel cylinders 16, 17 to initially energize the rear wheel brake assemblies 18, 19 in a time sequence substantially simultaneously with the energization of the front brake assemblies 11, 12.

During the initial energization of the front and rear brake assemblies 11, 12 and 18, 19, the fluid pressure at the inlet and outlet ports 25, 26 of the control valve 5 is substantially equal. The fluid pressure at the inlet port 25 acts on the smaller effective area $A_1$ of the piston 34 to establish an input force $F_1$, and the fluid pressure at the outlet port 26 acts on the larger effective area $A_2$ of said piston to establish an output force $F_2$ in opposition to the force $F_1$ across the piston 34. Since the force $F_2$ is predeterminately greater than the force $F_1$ due to the relationships of the areas $A_2$, $A_1$, respectively, the piston 34 is maintained in its original position with the large end 37 in abutting engagement with the shoulder 23. Simultaneously, the fluid pressure at the outlet port 26 acts on the effective area $A_3$ of the piston 27 to develop a force $F_3$ which maintains the piston 27 in its original position in abutting engagement with the shoulder 23. This energization of the front and rear brake assemblies 11, 12 and 18, 19 during the braking application establishes an inertia weight shift toward the front of the vehicle during deceleration. The ball valve 54 in response to its inertia at a predetermined vehicle deceleration (established by a predetermined applied fluid pressure and by the angle of inclination to the horizontal at which the control valve 5 is mounted when the vehicle is on a level roadway) rolls rightwardly relative to the piston 34 to a position sealably engaging the valve seat 44 to interrupt pressure fluid communication between the inlet and outlet ports 25, 26 of the control valve 5. As the input fluid pressure $Pi$ is increased above the value at which the ball valve 54 interrupted pressure fluid communication between the inlet and outlet ports 25, 26 the input fluid pressure $Pi$ acts on said ball valve to maintain it in sealing engagement with the valve seat 44. When the input fluid pressure $Pi$ is increased to a predetermined value C, the magnitude of the force $F_1$ exceeds the magnitude of the force $F_2$, thereby serving to concertedly move the piston 34 and ball cage member 43 rightwardly in the housing bore 21 and the counterbore 32 of the piston 27. This rightward movement of the piston 34 serves to increase the output fluid pressure $Po$ delivered to the rear brake assemblies 18, 19 in a ratio to the input fluid pressure $Pi$, as shown by the formula:

(1) $$Po_1 = \frac{PiA_1}{A_2}$$

As the piston 34 moves rightwardly the rightward end 37 abuttingly engages the shoulder 33 of the piston 27 so that the input force $F_1$ is now opposed across the pistons 27 and 34 by the forces $F_2$ and $F_3$. When the input fluid pressure $Pi$ is increased to a second predetermined value E, the magnitude of the force $F_1$ exceeds the magnitude of the forces $F_2$ plus $F_3$, thereby serving to concertedly move the pistons 34 and 27 rightwardly to increase the output fluid pressure $Po$ delivered to the rear brake assemblies 18, 19 in another ratio to the input fluid pressure $Pi$, as shown by the formula:

(2) $$Po_2 = \frac{PiA_1}{A_2 + A_3}$$

As illustrated by the graphical representation of the braking pressure in FIG. 3, the output fluid pressure Po in the control valve 5 to the rear brake assemblies 18, 19 is at first in a direct proportion, i.e., a 1:1 ratio, to the input fluid pressure Pi as shown by the line OB. During the time the inlet and outlet fluid pressures Pi and Po are in this direct proportion, the front and rear brake assemblies 11, 12 and 18, 19 are being energized substantially simultaneously to provide initial braking force for vehicle deceleration. The fluid pressure at point B is the predetermined fluid pressure attained at the inlet and outlet ports 25, 26 when the vehicle deceleration reaches the predetermined value in which the ball valve 54 rolls into sealing engagement with the valve seat 44 interrupting pressure fluid communication through the control valve 5 and effecting a ratio change between the input and output fluid pressures Pi and Po as described above; however, the output fluid pressure Po to the rear brake assemblies 18, 19 remains substantially constant as shown by the line BC' while the input fluid pressure Pi is increased as illustrated by the line BC. Upon Pi attaining the predetermined fluid pressure C, the input force $F_1$ attains a magnitude substantially equal to the output force $F_2$ across the control piston 34 and thereafter any increase in the input fluid pressure Pi, as illustrated by the line CD, will result in a proportional increase in the output fluid pressure Po, as illustrated by the line C'D', in the ratio of Formula 1 described hereinabove. The value D represents the fluid pressure when the rightward end 37 of the control piston 34 abuttingly engages the shoulder 33 of the piston 27, and thereafter the second ratio change is effected as described hereinabove. The output fluid pressure Po will remain substantially constant, as shown by the line D'E', while the input fluid pressure Pi is increased, as shown by the line DE. Upon the input fluid pressure Pi attaining the second predetermined value E, the force $F_1$ attains a magnitude sufficient to overcome the forces $F_2$ and $F_3$ and therafter any further increases in the input fluid pressure Pi, as illustrated by the line EG, will result in a proportional increase in the output fluid pressure Po, as illustrated by the line E'G', in a ratio of Formula 2 described hereinabove.

When the desired braking effort is attained, the manually applied force is removed from the brake pedal 2 permitting the return flow of dipslaced pressure fluid to the master cylinder 3. The front brake assemblies 11, 12 are de-energized by the return flow of pressure fluid from the wheel cylinders 9, 10 through the conduits 7, 8, 6 and 4 to the master cylinder 3. Removal of the manual force also has the effect of eliminating the input fluid pressure at the inlet port 25 of the control valve 5 so that the force $F_1$ acting on the piston 34 and the effect of the input fluid pressure Pi urging the ball valve 54 rightwardly are eliminated. Also, due to the control valve 5 being mounted at the aforementioned angle of inclination to the horizontal, the force of gravity, assisted by the output fluid pressure Po acting on the ball valve 54, causes it to roll leftwardly to its original positon at rest against the leftward end 48 of the ball cage member 43 and disengaged from the valve seat 44. This again establishes pressure fluid communication between the inlet and outlet ports 25, 26 through the axial bore and counterbore 40, 41 in the piston 34. With the axial counterbore 41 open, the output fluid pressure Po is eliminated, and the return springs 30, 53 urge the pistons 27, 34 leftwardly toward their original positions engaging the shoulder 23. When the pistons 27, 34 and the ball valve 54 are in their original positions, the rear brake assemblies 18, 19 are de-energized by the displaced pressure fluid flowing from the wheel cylinders 16, 17 through the conduits 15, 14 and 13 into the outlet port 26 of the control valve 5 and therefrom through the housing counterbore 22, the bore and counterbore 31, 32 in the piston 27, the aperture 51 in the retaining plate 50, the aperture 45 in the seal 44, the inside of the ball cage member 43 and the passage 47 therein, the counterbore and bore 41, 40 in the piston 34, and the housing bore 21 to the inlet port 25. The returning fluid flows from the inlet port 25 through the conduit 4 to the master cylinder 3 substantially simultaneous with the return flow from the front brake asemblies 11, 12, as previously described, to effect de-energization of the front and rear brake assemblies 11, 12 and 18, 19 at the same time.

Referring now to FIG. 4, another control or ratio changing valve 100 is shown having substantially the same component parts and functioning in the fluid pressure system 1 in substantially the same manner as the previously described control valve 5 with the following exceptions.

The housing 20 of the control valve 100 is provided with an axial groove or undercut 101 at the shoulder 23 and said groove has its rightward end connecting with the housing counterbore 22. An energy storing spring 102 is provided in the housing counterbore 22 having its leftward end in the groove 101 and the rightward end thereof concentrically aligned with the extension 29 on the piston 27. The spring 102 is biased between the housing end wall of the groove 101 and the piston 27 normally urging said piston rightwardly in opposition to the return spring 30 to its original position balanced between the opposing spring forces and spaced from the housing shoulder 23. Another energy storing spring 103 is provided in the housing bore 21 biased between the leftward end of the housing 20 and the leftward end 36 of the piston 34 normally urging said piston rightwardly in opposition to the return spring 53 to its original position balanced between the opposing spring forces and spaced from the housing shoulder 23.

In the operation of the control valve 100 with the component parts in their normal positions, as shown in FIG. 4, the initial pressure fluid flow between the inlet and outlet ports 25, 26 is accomplished as described hereinabove. Since the force $F_2$ established by the output fluid pressure Po acting on the area $A_2$ is predeterminately greater than the force $F_1$ established by the input fluid pressure Pi acting on the area $A_1$, the piston 34 is urged leftwardly against the force Fs of the energy storing spring 103 toward a pressure fluid displacement position compressing or loading the energy storing spring 103 and increasing the force Fs thereof. Also, the outlet fluid pressure Po acting on the effective area $A_3$ of the piston 27 develops the force $F_3$ which urges said piston leftwardly against the force Fc of the energy storing spring 102 toward its pressure fluid displacement position compressing or loading the energy storing spring 102 and increasing the force Fc thereof. When the predetermined fluid pressure B is attained and the ball valve 54 sealably engages the valve seat 44 to interrupt pressure fluid flow through the piston 34, the forces $F_1$ and Fs are balanced by the opposing output force $F_2$. As the input fluid pressure Pi is increased above the value B, the additive magnitudes of the input force $F_1$ and spring force Fs exceed the magnitude of the output force $F_2$, thereby serving to move the piston 34 rightwardly toward its pressure fluid displacing position, serving to increase the output fluid pressure Po delivered to the rear brake assemblies 18, 19 in a ratio to the input fluid pressure Pi, as shown by the formula:

$$(3) \quad Po_1 = \frac{PiA_1 + Fs}{A_2}$$

As the piston 34 is moving rightwardly in its pressure fluid displacing direction, the output fluid pressure Po continues to act on the piston 27 to move the piston 27 leftwardly and continues to load the spring 102. As the input fluid pressure Pi is further increased and the piston 45 is urged rightwardly, the spring 103 releases its stored energy and the force Fs is diminished or eliminated due to the decompressing or unloading of the spring 103. When the spring force $Fs$ is substantially eliminated and a predetermined ratio between $Po$ and $Pi$ is attained, the rightward end 37 of the piston 34 abuttingly engages the shoulder 33 of the piston 27. With the piston end 37 engaging the shoulder 33, the input force $F_1$ plus the spring force $Fc$ balance the opposing output forces $F_2$ and $F_3$ and thereafter a further increase in the input fluid pressure $Pi$ serves to concertedly move the pistons 34 and 27 rightwardly in a pressure fluid displacing direction to increase the output fluid pressure $Po$ delivered to the rear brake assemblies 18, 19 in a second ratio to the input fluid pressure $Pi$, as shown by the formula:

(4)
$$Po_2 = \frac{PiA_1 + Fc}{A_2 + A_3}$$

It should be noted that as the input fluid pressure $Pi$ is increased and the pistons 34 and 27 are urged rightwardly, the spring 102 releases its stored energy and the force $Fc$ is diminished and finally eliminated upon the free length extension of said spring.

As illustrated by the graphical representation of the braking pressure in FIG. 5, the output fluid pressure $Po$ in the control valve 100 to the rear brake assemblies 18, 19 is at first in a direct proportion (i.e., a 1:1 ratio) to the input fluid pressure $Pi$, as shown by the line OB. During the time the inlet and outlet fluid pressures $Pi$ and $Po$ are in this direct proportion, the front and rear brake assemblies 11, 12 and 18, 19 are being energized substantially simultaneously to provide initial braking force for vehicle deceleration and the pistons 34 and 27 are simultaneously moving leftwardly to a pressure fluid displacing position loading or storing energy in the springs 102, 103, respectively. The fluid pressure at point B is that attained at the inlet and outlet ports 25, 26 when the ball valve 54 interrupts pressure fluid communication through the control valve 100 and the ratio change between the input and output fluid pressures $Pi$, $Po$ is effected, as described hereinabove. As the input fluid pressure $Pi$ is increased above the value B, as illustrated by the line BH, the input force $F_1$ is likewise increased which is additive to the force $Fs$ of the spring 103 releasing its stored energy or unloading to move the piston 34 rightwardly in its fluid pressure displacing direction, thereby increasing the output fluid pressure $Po$, as illustrated by the line BH', in the ratio of Formula 3 described hereinabove. The release of the stored energy $Fs$ by the spring 103 has the effect of assisting in the establishment of simultaneous increases in the output fluid pressure $Po$ in proportion to increases in the fluid pressure $Pi$ which provides a smooth transition during the ratio change, and when the input fluid pressure $Pi$ attains the value H, the piston 34 has moved rightwardly to a position where the spring 103 has released its stored energy and is now ineffective in assisting in further rightward movement of said piston. As the input fluid pressure $Pi$ is increased above the value H, as shown by the line HJ, a proportional increase in the output fluid pressure $Po$ results, as shown by the line H'J', in the ratio of Formula 1 described hereinbefore. This increased output fluid pressure $Po$ serves to continue to move the piston 27 leftwardly toward its pressure fluid displacing position loading or storing energy in the spring 102.

The fluid pressure at the point J is that attained when the rightward end of the piston 34 has abuttingly engaged the shoulder 33 of the piston 27, and thereafter any increase in the input fluid pressure $Pi$ above the value J, as illustrated by the line JK, results in an increase in the input force $F_1$ which is additive to the force $Fc$ of the spring 102 releasing its stored energy or unloading to move the piston 27 rightwardly with the piston 34, thereby increasing the output fluid pressure $Po$, as illustrated by the line J'K', in the ratio of Formula 4 described hereinbefore. The release of the stored energy $Fc$ by the spring 102 has the effect of assisting in a smooth transition into the second ratio change between the input and output fluid pressures $Pi$, $Po$ and after the spring 102 has released its stored energy, increases in the input fluid pressure $Pi$ above the value K, as shown by the line KL, results in a proportional increase in the output fluid pressure $Po$, as shown by the line K'M, in the ratio of Formula 2 described hereinbefore.

Referring now to FIG. 6, another control or ratio changing valve 200 is shown having substantially the same component parts and functioning in the fluid pressure system 1 in substantially the same manner as the previously described control valve 100 with the exception that fluid pressure flow through the control valve 200 is controlled by a fluid pressure responsive valve, rather than a deceleration responsive valve, as shown in the control valves 5 and 100. By using a fluid pressure responsive valve in the control valve 200, it is not necessary to mount the control valve on an angle as was required with the control valves 5 and 100. The construction of the control valve 200 differs from the construction of the control valve 100 in the following manner.

A retaining plate member 201 is provided in the housing bore 21 and is interposed between the rightward end of the spring 103 and the leftward end 36 of the piston 34, and said retaining member is provided with a plurality of fluid pressure flow apertures 202 therethrough. A blind bore and counterbore 203, 204 are provided in the leftward end 36 of the piston 34, and said bore and counterbore define an annular shoulder 205 at the juncture thereof. A fluid pressure passage 206 is provided in the piston 34 having one end connected with the counterbore 204 and the other end thereof extending through the rightward piston end 37.

A valve member, indicated generally at 207, is provided with a body portion 208 which is slidably received in the bore 203, and a seal 209 is provided in the counterbore 204 adjacent to the shoulder 205 for sealing engagement between said valve body portion and said counterbore. An enlarged head 210 is integrally formed on the leftward end of the body portion 208, and an annular seal 211 is carried in said head adjacent the peripheral portion thereof for sealing engagement with the piston end 36, which forms an annular valve seat about the piston counterbore 204. A valve spring 212 is concentric with the periphery of the valve body portion 208 and is biased between the seal 209 and the valve head 210 normally urging said valve head into abutting engagement with the retaining member 201. An effective fluid pressure responsive area $A_4$ is defined on the valve member 207 across the valve body portion 208.

The input fluid pressure $Pi$ acting on the area $A_4$ establishes a force $F_4$ urging said valve member 207 rightwardly, and this rightward movement of the valve member 207 is resisted by the force $Fv$ of the spring 212. When the fluid pressure attains a predetermined value (equivalent to the point B on the graph in FIG. 5) the pistons 27, 34 are moved leftwardly loading or storing energy in the springs 102, 103, respectively, and the force $F_4$ overcomes the spring force $Fv$ moving the valve member 207 toward a position engaging the seal 211 thereof with the piston end 36 to interrupt pressure fluid flow through the counterbore 204 and passage 206 of the piston 34. Thereafter, the control valve 200 operates to establish a ratio change between the input and output fluid pressures $Pi$, $Po$ substantially the same as the control valve 100, as previously described.

Referring now to FIG. 7, another control or ratio changing valve 300 is shown which functions in the fluid pressure system 1 in substantially the same manner as the previously described control valve 100. The control valve 300 is provided with a housing 320 having an axially aligned bore and counterbore 321, 322 therein, and an abutment or radial shoulder 323 is defined at the intersection thereof. The leftward end of the bore 321 is closed by the housing 320, and the rightward end of the counterbore 322 is closed by a plug member 324 threadedly received therein. An inlet port 325 is provided in the housing 320 connecting with the bore 321 adjacent the leftward end thereof, and outlet port 326 is provided through the plug member 324 connecting with the rightward end of the counterbore 322.

A control or ratio changing piston, indicated generally at 327, is provided with a stepped body portion 328 having opposed ends 329, 330 which are slidably received in the bore and counterbore 321, 322, respectively. A sealing cup 331 having an aperture 332 therein is sealably engaged between the piston smaller or leftward end 329 and the housing bore 321 and includes an inner lip portion 333 about said aperture, and a peripheral seal 334 is provided on the piston larger or rightward end 330 in sealing engagement with the housing counterbore 322. A return spring 335 is biased between the plug member 324 and the rightward end 330 of the piston 327, and an energy storing spring 336 is biased between the rightward end 330 of the piston 327 and the housing shoulder 323 normally urging said piston rightwardly to its original position poised between the opposed forces of the springs 335, 336. A bore and counterbore 337, 338 are axially provided through the piston 327 defining an abutment or radial shoulder 339 at the juncture thereof, and said bore extends through the leftward end 329 substantially coaxial with the aperture 332 in the sealing cup 331.

Another ratio changing or control piston, indicated generally at 340, is provided with a body portion 341 having opposed ends 342, 343 which are slidably received in the bore and counterbore 337, 338 of the piston 327, respectively. A seal 344 is provided on the rightward or larger piston end 343 for sealing engagement with the counterbore 338, and the leftward or smaller piston end 342 extends through the aperture 332 in the sealing cup 331 with the inner lip 333 of said cup sealably engaging the outer periphery of said leftward piston end. An axial bore 345 extends through the opposed ends of the piston 340 and an energy storing spring 346 is concentrically aligned with the body portion 341 and biased between the shoulder 339 on the piston 327 and the rightward end 343 of the piston 340. A return spring 347 is biased between the plug member 324 and the rightward end 343 of the piston 340 normally urging said piston to its original position poised between the opposed forces of the springs 346, 347.

A ball cage assembly, indicated generally at 348, is provided in the housing bore 321 and is abuttingly engageable with the leftward end 342 of the piston 340. A hollow cylindrical ball cage member 349 is provided with a valve seal or seat 350 molded on the rightward end thereof, and said seal is provided with a centrally located aperture 351 therethrough substantially coaxial with the bore 345 in the piston 340. Longitudinal ribs or flutes 352 are provided on the inside of the ball cage member 349, and a plurality of radially extending passages 353 extend through the rightward end of the ball cage member 349 adjacent to the valve seat 350 connecting the housing bore 321 with the interior of said ball cage member. A retaining plate 354 is provided in the ball cage member 349 adjacent to the inwardly extending leftward end 355 thereof, and said retaining plate engages the ribs 352 to prevent the rightward movement of said retaining plate realtive to said ball cage member. A return spring 356 has its rightward end thereof clamped between the curled leftward end 355 of the ball cage member 349 and the retaining plate 354 and is biased between said retaining plate and the leftward end of the housing bore 321 normally urging the ball cage assembly 348 rightwardly to its original position engaging the seal 350 with the leftward end 342 of the piston 340 about the bore 345. An inertia or deceleration responsive ball valve 357 is provided in the ball cage member 349 for sealing engagement with the valve seat 350, and the ball valve 357 is retained against displacement from the ball cage member 349 by the retaining plate 354, and the flutes 352 permit said ball to freely roll between said retaining plate and said valve seat and also permit the flow of fluid past said ball. With the control valve 300 mounted at an inclined angle to the horizontal so that the inlet port 325 is lower than the outlet port 326, the ball valve 357 is normally in its leftward position at rest against the retaining plate 354 and disengaged from the valve seat 350.

To complete the description of the control valve 300, it should be noted that the leftward end 342 of the piston 340 slidable in the bore 337 of the piston 327 defines the effective fluid pressure responsive area $A_1$ and the opposing effective fluid pressure responsive area $A_2$ is defined on the rightward end 343 of the piston 340 slidable in the counterbore 338 of the piston 327. Also, the effective fluid pressure responsive area $A_3$ is defined by the rightward end 331 of the piston 327 minus the area of the counterbore 338 or $A_2$, and another effective fluid pressure responsive area $A_5$ is defined on the leftward end 329 of the piston 327 minus the area of the bore 337 or $A_1$, said area $A_3$ being proportionally greater than the area $A_5$. In the embodiment of the control valve 300 shown, it should be noted that the springs 336 and 346 are substantially at their free lengths when the pistons 327 and 340 are in their original positions so that the fluid pressure transitions may be established smoothly. However, it should be understood that if a smooth fluid pressure transition is not desired, the springs 336 and 346 may be provided with a pre-load which will establish a plateau or step at the fluid pressure transitions.

In the operation with the component parts of the control valve 300 in their normal positions, as shown in FIG. 7 and as described hereinabove, a manually applied force on the brake pedal 2 displaces pressure fluid from the master cylinder 3 through the conduits 4, 6, 7 and 8 into the wheel cylinders 9, 10 to initially energize the front wheel brake assemblies 11, 12. The displaced pressure fluid also flows from the conduit 4 through the inlet port 325 of the control valve 300 into the housing bore 321 and therefrom through the passages 353 and the inside of the ball cage member 349, the aperture 351 in the seal 350, the bore 345 of the piston 340 and the counterbore 338 of the piston 327 into the housing counterbore 322. The displaced pressure fluid flows from the counterbore 322 through the outlet port 326 and conduits 13, 14 and 15 into the wheel cylinders 16, 17 to initially energize the rear wheel brake assemblies 18, 19 in a time sequence substantially simultaneously with the energization of the front brake assemblies 11, 12.

During the initial energization of the front and rear brake assemblies 11, 12 and 18, 19, the fluid pressures at the inlet and outlet ports 325, 326 of the control valve 300 are substantially equal. The fluid pressure at the inlet port 325 acts on the smaller effective area $A_1$ of the piston 340 to establish the input force $F_1$, and the fluid pressure at the utlet port 326 acts on the larger effective area $A_2$ of said piston to establish the output force $F_2$ in opposition to the force $F_1$ across the piston 340. Since the force $F_2$ is predeterminately greater than the force $F_1$ due to the relationships of the areas $A_2$, $A_1$, respectively, the piston 340 and the ball cage assembly 348 are urged leftwardly against the return spring 356 and the force $Fs$ of the energy storing spring 346 toward a pressure fluid displacement position compressing or loading the energy storing spring 346 and increasing the force $Fs$ thereof. Simultaneously, the fluid pressure at the inlet port 325 acts on the effective area $A_5$ of the piston 327 to develop another input force $F_5$, and the fluid pressure at the outlet port 326 acts on the larger effective area $A_3$ of said piston to establish the output force $F_3$ in opposition to the force $F_5$ across the piston 327. Since the force $F_3$ is predeterminately greater than the force $F_5$ due to the relationships of the areas $A_3$, $A_5$, respectively, the piston 327 is urged leftwardly against the force $Fc$ of the energy storing spring 336 toward a pressure fluid displacement position compressing or loading the energy storing spring 336 and increasing the force Fc thereof. Since the spring 346 is biased between the pistons 327 and 340, it should be understood that the spring force Fs thereof has no effect on the force equilibrium of said pistons and that the input forces $F_1$ and $F_5$ plus the force Fc of the spring 336 are balanced by the output forces $F_2$ and $F_3$.

This energization of the front and rear brake assemblies 11, 12 and 18, 19 during the braking application establishes an inertia weight shift toward the front of the vehicle during deceleration. The ball valve 357 in response to its inertia at a predetermined vehicle deceleration (established by a predetermined applied fluid pressure and by the angle of inclination to the horizontal at which the control valve 300 is mounted when the vehicle is on a level roadway) rolls rightwardly in the ball cage assembly 348 to a position sealably engaging the valve seat 350 to interrupt pressure fluid communication between the inlet and outlet ports 325, 326 of the control valve 300. As the input fluid pressure Pi is increased above the value at which the ball valve 357 interrupted pressure fluid communication between the inlet and outlet ports 325, 326 the input fluid pressure Pi acts on said ball valve to maintain it in sealing engagement with the valve seat 350 and the input forces $F_1$ and $F_5$ plus the spring force Fc are balanced by the output forces $F_2$ and $F_3$. Therefore, as the input fluid pressure Pi is increased, the additive magnitudes of the input forces $F_1$, $F_5$ and the spring force Fc exceeds the magnitude of the output forces $F_2$ and $F_3$, thereby serving to move the piston 327 rightwardly. This rightward movement of the piston 327 serves to increase the output fluid pressure Po delivered to the rear brake assemblies 18, 19 in a ratio to the input fluid pressure Pi, as shown by the formula:

(5) $$Po_1 = \frac{Pi(A_1+A_4)+Fc}{A_2+A_3}$$

As the piston 327 is moving rightwardly in its pressure fluid displacing direction, the output fluid pressure Po continues to act on the rightward end 343 of the piston 340 to move the piston 340 leftwardly continuing to load the spring 346. As the input fluid pressure Pi is further increased and the piston 327 is urged rightwardly, the spring 336 releases its stored energy and the force Fc is diminished or eliminated due to the de-compressing or unloading of the spring 336. When the spring force Fc is eliminated, the output fluid pressure is increased in proportion to the input fluid pressure in the ratio of the areas $$A_1+A_5 : A_2+A_3$$

When a predetermined ratio between Po and Pi is attained, the input force $F_1$ plus the spring force Fs balance the opposing output forces $F_2$ and thereafter a further increase in the input fluid pressure Pi serves to move the piston 340 rightwardly. The ball cage member 349 is also urged rightwardly by the spring 356 to maintain the seal 350 in engagement with the piston 340. This rightward movement of the piston 340 in a pressure fluid displacing direction increases the output fluid pressure Po delivered to the rear brake assemblies 18, 19 in a second ratio to the input fluid pressure Pi, as shown by the formula:

(6) $$Po_2 = \frac{PiA_1+F_s}{A_2}$$

It should be noted that as the input fluid pressure Pi is increased and the piston 340 urged rightwardly, the spring 346 releases its stored energy and the force Fs is diminished and finally eliminated upon the free length extension of said spring. The relation of the input to the output fluid pressure is thereafter effected by the ratio of the areas $A_1 : A_2$.

The effect of the control valve 300 on the fluid pressure in the fluid pressure system 1 is substantially as illustrated in the graphical representation of FIG. 5. The output fluid pressure Po in the control valve 300 to the rear brake assemblies 18, 19 is at first in a direction proportional (i.e., a 1:1 ratio) to the input fluid pressure Pi, as shown by the line OB. During the time the inlet and outlet fluid pressures Pi and Po are in this direction proportion, the front and rear brake assemblies 11, 12 and 18, 19 are being energized substantially simultaneously to provide initial braking force for vehicle deceleration and the pistons 340 and 327 are simultaneously moving leftwardly to a pressure fluid displacing position loading or storing energy in the springs 346, 336, respectively. The fluid pressure at point B is that attained at the inlet and outlet ports 325, 326 when the ball valve 357 interrupts pressure fluid communication through the control valve 300 and the ratio change between the input and output fluid pressures Pi, Po is effected, as described hereinabove. As the input fluid pressure Pi is increased above the value B, as illustrated by the line BH, the input forces $F_1$ and $F_5$ are likewise increased which is additive to the force Fc of the spring 336 releasing its stored energy or unloading to move the piston 327 rightwardly in its fluid pressure displacing direction, thereby increasing the output forces $F_2$ and $F_3$ and the output fluid pressure Po, as illustrated by the line BH', in the ratio of Formula 5 described hereinabove. The release of the stored energy Fc by the spring 336 has the effect of assisting in the establishment of simultaneous increases in the output fluid pressure Po in proportion to increases in the fluid pressure Pi which provides a smooth transition during the ratio change, and when the input fluid pressure Pi attains the value H, the piston 327 has moved rightwardly to a position where the spring 336 has released its stored energy and is now ineffective in assisting in further rightward movement of said piston. As the input fluid pressure Pi is increased above the value H, as shown by the line HJ, a proportional increase in the output fluid pressure Po results, as shown by the line H'J, in the ratio of the areas $A_1+A_5 : A_2+A_3$. This increased output fluid pressure Po serves to continue to move the piston 340 leftwardly toward its pressure fluid displacing position loading or storing energy in the spring 346.

Thereafter, any increase in the input fluid pressure Pi above the value J, as illustrated by the line JK, results in an increase in the input force $F_1$ which is additive to the force Fs of the spring 346 releasing its stored energy or unloading to move the piston 340 rightwardly, thereby increasing the output fluid pressure Po, as illustrated by the line J'K', in the ratio of Formula 6 described hereinabove. The release of the stored energy Fs by the spring 346 has the effect of assisting in a smooth transition into the second ratio change between the input and output fluid pressures Pi, Po and after the spring 346 has released its stored energy, increases in the input fluid pressure Pi above the value K, as shown by the line KL, results in a proportional increase in the output fluid pressure Po, as shown by the line K'M, in the ratio of the areas $A_1 : A_2$.

When the desired braking effort is attained, the manually applied force is removed from the brake pedal 2 permitting the return flow of displaced pressure fluid to the master cylinder 3. The front brake assemblies 11, 12 are de-energized by the return flow of pressure fluid from the wheel cylinders 9, 10 through the conduits 7, 8, 6 and 4 to the master cylinder 3. Removal of the manual force also has the effect of eliminating the input fluid pressure at the inlet port 325 of the control valve 300 so that the forces $F_1$ and $F_5$ acting on the pistons 340 and 327, respectively, and the effect of the input fluid pressure Pi urging the ball valve 357 rightwardly are eliminated. Also, due to the control valve 300 being mounted at the aforementioned angle of inclination to the horizontal, the force of gravity, assisted by the output fluid pressure Po acting on the ball valve 357, causes it to roll leftwardly to its original position at rest against the retaining plate 354 in the ball cage member 349 and disengaged from the valve seat 350. This again establishes pressure fluid communication between the inlet and outlet ports 325, 326 through the axial bore 345 in the piston 340. With the axial bore 345 open, the output fluid pressure Po is eliminated, and the pistons 327, 340 return to their original positions poised between the springs 335 and 346, 347, respectively. When the pistons 327, 340 and the ball valve 357 are in their original positions, the rear brake assemblies 18, 19 are de-energized by the displaced pressure fluid flowing from the wheel cylinders 16, 17 through the conduits 15, 14 and 13 into the outlet port 326 of the control valve 300 and therefrom through the housing counterbore 322, the counterbore 338 in the piston 327, the bore 345 in the piston 340, the aperture 351 in the seal 350, the inside of the ball cage member 349 and the passage 353 therein, and the housing bore 321 to the inlet port 325. The returning fluid flows from the inlet port 325 through the conduit 4 to the master cylinder 3 substantially simultaneous with the return flow from the front brake assemblies 11, 12, as previously described, to effect de-energization of the front and rear brake assemblies 11, 12 and 18, 19 at the same time.

The embodiments of the invention in which an exclusive property or privilege is claimed are defined as follows:

1. A brake control device for a vehicle comprising a housing, a pair of members relatively and concertedly movable in said housing for controlling the application of fluid pressure from said housing in response to fluid pressure supplied thereto, one of said members including means movable toward a position isolating the applied fluid pressure from the supplied fluid pressure at a predetermined value thereof upon the occurrence of predetermined conditions during brake energization, one of said one member and the other of said members being movable relative to the other of said one and other members in response to increases in the supplied fluid pressure predeterminately in excess of the predetermined value when said included means is in its isolating position to effect increases in the isolated applied fluid pressure in a predetermined ratio therewith, a pair of abutments respectively on said members, said one of said one and other members being responsive to further increases in the supplied fluid pressure to another predetermined value predeterminately greater than the first named predetermined value to drivingly engage one of said abutments with the other thereof, and said one and other members being thereafter concertedly movable upon the engagement of said abutments in response to increases in the supplied fluid pressure predeterminately in excess of the other predetermined value to effect further increases in the isolated applied fluid pressure in another predetermined ratio therewith.

2. The brake control device according to claim 2, comprising opposed differential areas on said one of said one and other members respectively subjected to the supplied and applied fluid pressures, and another area on said other of said one and other members subjected to the applied fluid pressure.

3. The brake control device according to claim 1, wherein said one and other members define with said housing a flow passage therethrough for the supplied and applied fluid pressures, and a valve seat on said one member about said flow passage, said included means being movable toward its isolating position into engagement with said valve seat and closing said flow passage upon the occurrence of the predetermined conditions during brake energization.

4. The brake control device according to claim 1, comprising other means on said housing defining abutment means for engagement with said one and other members, a first area on said one of said one and other members subjected to the supplied fluid pressure, a second area on said one of said one and other members subjected to the applied fluid pressure and being opposed to and predeterminately greater than said first area, said second area being responsive to applied fluid pressure to urge said one of said one and other members toward engagement with said abutment means and said one of said one and other members being disengaged from said abutment means upon the movement of said one of said one and other members relative to said other of said one and other members, and a third area on said other of said one and other members additive to said second area and subjected to the applied fluid pressure, said third area being responsive to the applied fluid pressure to urge said other of said one and other members toward engagement with said abutment means and said other of said one and other members being disengaged from said abutment means upon the concerted movement of said one and other members.

5. The brake control device according to claim 4, comprising opposed end portions on said other of said one and other members, one of said end portions being normally engaged with said abutment means and the other of said end portions defining said third area, passage means in said other of said one and other members between said opposed end portions, opposed ends on said one of said one and other members, one of said opposed ends being slidable in said housing and defining said first area and the other of said ends being slidable in said passage means and defining said second area, and other abutment means on said one of said one and other members between the opposed ends thereof normally engaged with said first named abutment means.

6. The brake control device according to claim 5, comprising other passage means in said one of said one and other members between the opposed ends thereof and connecting with said first named passage means, and a valve seat on said one of said one and other members about said other passage means, said included means being movable to its isolating position into engagement with said valve seat and closing said other passage means upon the occurrence of the predetermined conditions during brake energization.

7. A brake control device for a vehicle comprising a housing having a pair of ports therein, means including piston means movable in said housing between said ports and movable means for controlling pressure fluid communication between said ports, said movable means being movable upon the occurrence of predetermined conditions during brake energizations toward a position interrupting pressure fluid communication between said ports at a predetermined value thereof and said piston means being thereafter movable when said movable means is in its pressure fluid communication interrupting position in response to increased values of the fluid pressure at one of said ports predeterminately in excess of the predetermined value to effect increases in the fluid pressure at the other of said ports in excess of the predetermined value in a predetermined ratio therewith, other piston means movable in said housing between said first named piston means and said other port, a pair of abutments on said first named and other piston means normally spaced from each other, respectively, said first named piston means being responsive to further increases in the fluid pressure at said one port to another value predeterminately greater than said first named predetermined value to move one of said abutments into driving engagement with the other of said abutments, and said first named and other piston means being thereafter concertedly movable upon the driving engagement of said abutments in response to values of the fluid pressure at said one port predeterminately in excess of the other predetermined value acting on said first named piston means to effect increases in the fluid pressure at said other port acting on said first named and other piston means in another predetermined ratio therewith different than the first named predetermined ratio.

8. The brake control device according to claim 7, comprising opposed differential areas on said first named piston means respectively subjected to the fluid pressures at said one and other ports, and another area on said other piston means subjected to the fluid pressure at said other port.

9. The brake control device according to claim 7, comprising a valve seat on said first named piston means between said ports, said movable means being movable toward its pressure fluid communication interrupting position into engagement with said valve seat closing pressure fluid communication between said ports upon the occurrence of the predetermined conditions during brake energization.

10. The brake control device according to claim 7, comprising other means on said housing defining abutment means for said first named and other piston means, a first effective area on said first named piston means subjected to the fluid pressure at said one port, a second effective area on said first piston means subjected to the fluid pressure at said other port and being opposed to and predeterminately greater than said first area, said second area being responsive to fluid pressure at said other port to urge said first named piston means toward engagement with said abutment means and said first named piston means being disengaged from said abutment means upon the movement thereof in response to the increased values of the fluid pressure at said one port predeterminately in excess of the first named predetermined value acting on said first area, and a third area on said other piston means subjected to the fluid pressure at said other port, said third area being responsive to fluid pressure at said other port to urge said other piston means toward engagement with said abutment means and said other piston means being disengaged from said abutment means upon the concerted movement thereof with said first named piston means.

11. The brake control device according to claim 10, comprising opposed end portions on said other piston means, one of said end portions being normally engaged with said abutment means and the other of said end portions defining said third area, a bore in said other piston means connected between said one and other end portions, opposed ends on said first named piston means, one of said ends being movable in said housing and defining said first area and the other of said ends being slidable in said bore and defining said second area, and other abutment means on said first named piston means between said one and other ends thereof normally engaged with said first named abutment means.

12. The brake control device according to claim 11, comprising a bore in said housing connected with a counterbore, a should on said housing at the juncture of said housing bore and counterbore defining said first named abutment means, said one and other ports being respectively connected with said housing bore and counterbore, said other piston means being slidable in said housing counterbore between said shoulder and said other port, and said one end of said first named piston means being slidable in said housing bore between said shoulder and said one port.

13. The brake control device according to claim 7, comprising passage means in said first named piston means connected between said one and other ends, a valve seat on said first named piston means about said passage means, and said movable means including an inertia responsive member movable in said first named piston means and into engagement with said valve seat to interrupt the pressure fluid communication between said ports upon the occurrence of the predetermined conditions during brake energization.

References Cited

UNITED STATES PATENTS

| | | | |
|---|---|---|---|
| 3,398,757 | 8/1968 | Milster | 303—24 X |
| 2,218,194 | 10/1940 | Freeman | 137—39 X |
| 3,143,125 | 8/1964 | Stelzer | 137—38 |
| 3,143,379 | 8/1964 | Eksergian | 137—38 X |
| 3,147,045 | 9/1964 | Stelzer | 137—38 X |
| 3,147,046 | 9/1964 | Stelzer | 137—38 X |
| 3,252,740 | 5/1966 | Stelzer | 137—38 X |

MILTON BUCHLER, Primary Examiner
JOHN J. McLAUGHLIN, JR., Assistant Examiner

U.S. Cl. X.R.

60—54.5; 137—38; 188—152; 303—6